O. FUSCALDO.
CONNECTION OF MOTOR VEHICLE WHEELS TO THE VERTICES OF A RHOMBUS.
APPLICATION FILED APR. 13, 1921.
1,426,975.
Patented Aug. 22, 1922.
3 SHEETS—SHEET 2.
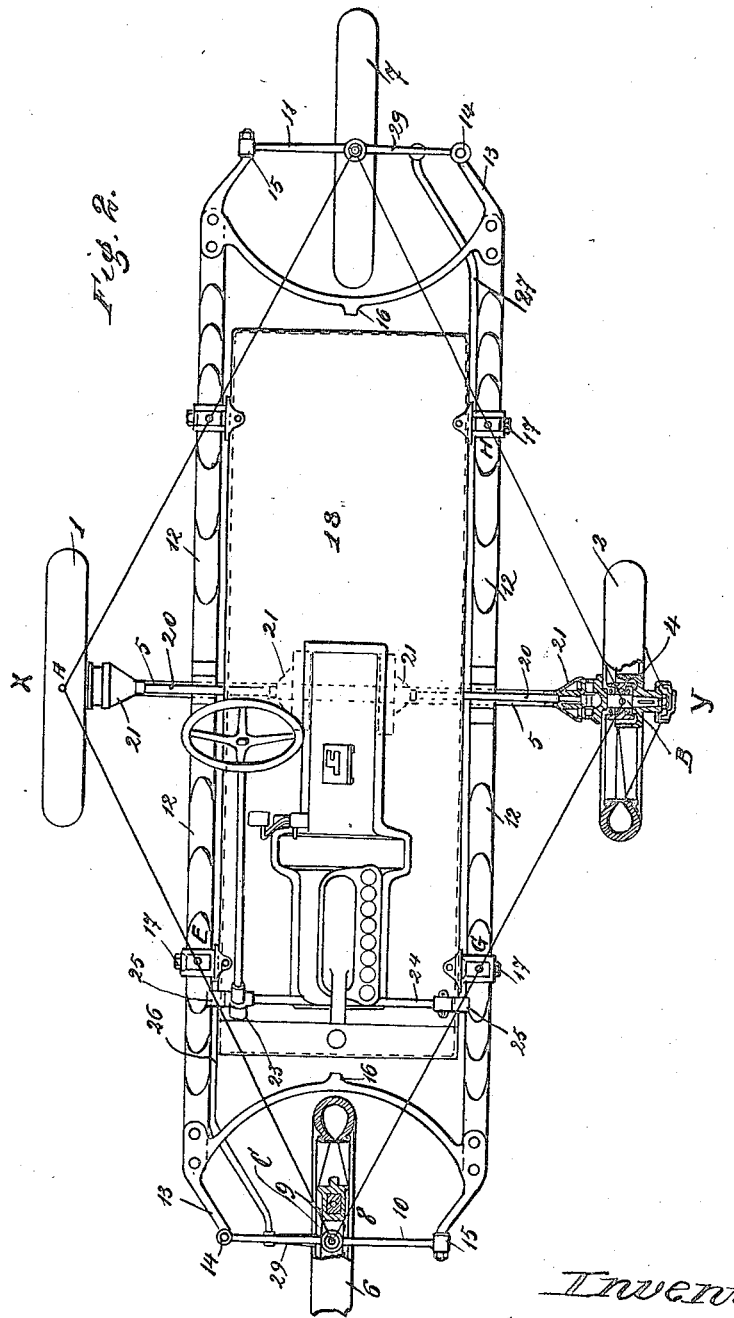
Inventor
O. Fuscaldo,
By Marks & Clerk
Attys.

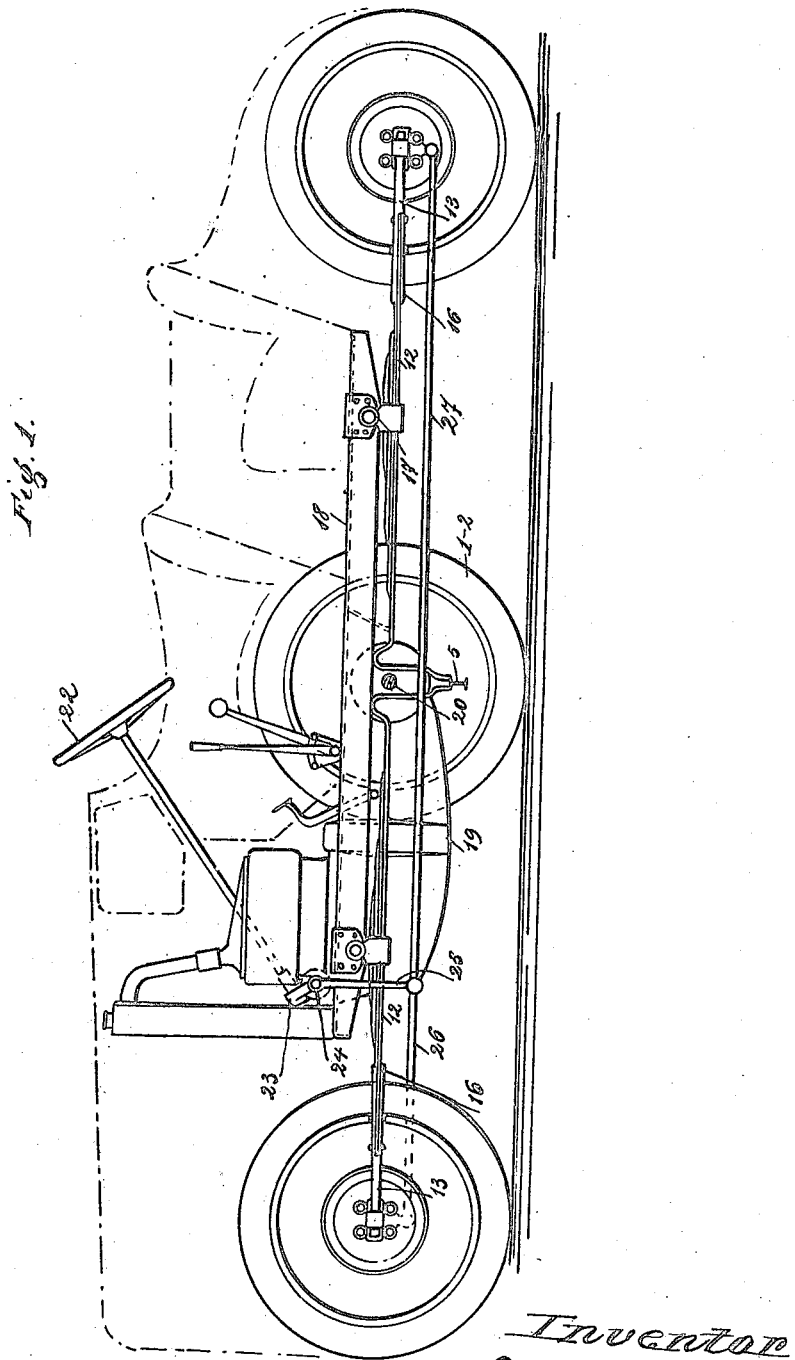

O. FUSCALDO.
CONNECTION OF MOTOR VEHICLE WHEELS TO THE VERTICES OF A RHOMBUS.
APPLICATION FILED APR. 13, 1921.
1,426,975.
Patented Aug. 22, 1922.
3 SHEETS—SHEET 3.
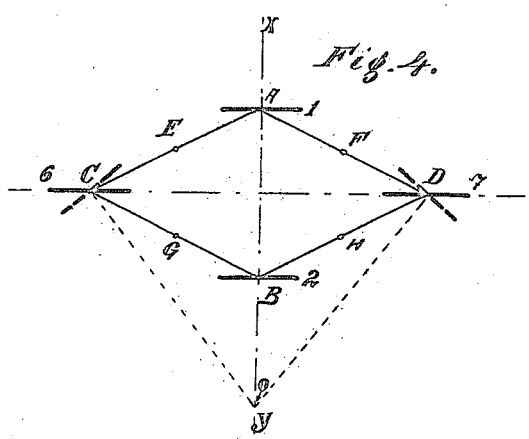
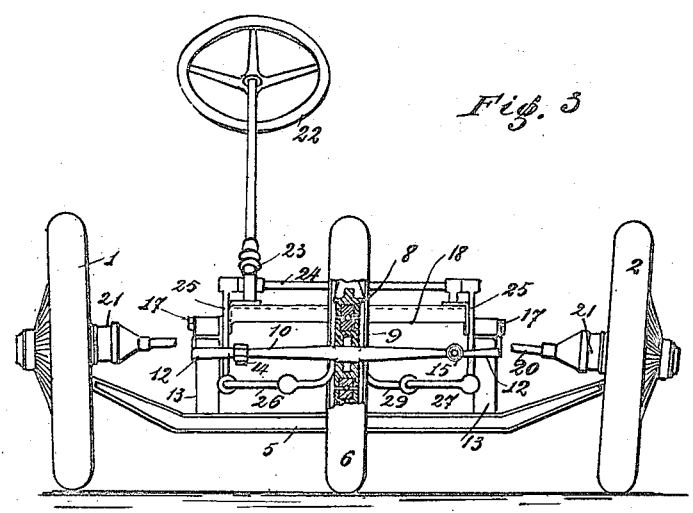

UNITED STATES PATENT OFFICE.

OTTAVIO FUSCALDO, OF BRESCIA, ITALY.

CONNECTION OF MOTOR-VEHICLE WHEELS TO THE VERTICES OF A RHOMBUS.

1,426,975.         Specification of Letters Patent.    Patented Aug. 22, 1922.

Application filed April 13, 1921.  Serial No. 461,092.

*To all whom it may concern:*

Be it known that I, OTTAVIO FUSCALDO, subject of the King of Italy, residing at 4 Via Mario Alberto, Brescia, Kingdom of Italy, have invented certain new and useful Arrangements for Connection of Motor-Vehicle Wheels to the Vertices of a Rhombus, of which the following is a specification.

The present invention relates to a connecting arrangement for motor vehicle wheels situated at the vertices of a rhombus, owing to which the vehicle platform rests on an resilient frame built up on each side by a pair of laminated springs pivotally connected with each other and with the axle of the driving wheels, the two springs of each pair being arranged in alignment and supporting the platform at points corresponding to the intersection of the springs with the centers of the ideal sides of the rhombus at whose vertices the wheels are fitted.

A further characteristic feature of the invention consists in the fact that each guiding wheel is mounted on a vertical spindle or pivot, whose axis coincides with the center plane of the wheel, the said spindle being carried by axles whose one end is hinged to one end of an arch-shaped crossbar forming the header of the vehicle elastic frame and whose other end is removably secured to the other end of said crossbar.

From the said novel arrangements a novel practical suspension system results which in conjunction with the constructional details set out hereinafter permits of the practical adoption of the rhombus arrangement of the wheels with the following advantages over the other motor vehicle arrangements heretofore used and known:

1. Rational and exceptionally elastic suspension even when travelling on very uneven ground.
2. Practically exact turning of the vehicle, to such a degree that the vehicle can turn upon one of its driving wheels as turning center.
3. Lightness of construction.
4. High efficiency due to several parts being simplified or dispensed with and to the form of the body matching the arrangement of the vehicle parts and being more adapted to overcome the air resistance.

The annexed drawing shows, by way of example, one execution form of the invention.

Fig. 1 is a diagrammatic view of the motor vehicle according to the invention in side elevation, one of the side wheels being removed.

Fig. 2 is a plan.

Fig. 3 is a front view.

Fig. 4 is a geometric diagram of the rhomboidal frame.

1 and 2 are the driving wheels, which may be of any desired type. The wheels are ordinarily arranged at the vertices of the obtuse angles of the rhombus and keyed to spindles 3 adapted to swivel inside of the ball bearing hubs 4, solid with the center axle 5.

6 and 7 are the guiding wheels arranged at the acute angles of the rhombus for which the resistance arm or overhang arm is reduced to zero by adopting the lodging arrangement forming the subject matter of my copending application Serial No. 461,091 according to which the axis of the vertical spindle about which the wheel is adapted to swivel coincides with the center plane of the wheel. Each guiding wheel accordingly runs on a ball bearing 8 containing the vertical spindle about whose axis the axles 10 and 11 are pivoting.

In this way the centres of the four wheels 1, 2, 6 and 7 are arranged at the vertices of a rhombus A—B—C—D, in which the axis X—Y of the driving wheels constitutes the shorter diagonal.

The connection among the wheels is given by an elastic frame comprising four laminated springs 12, the two springs arranged on the same side of the rhombus being interlinked in alignment and having the fore and respectively the rear free ends connected by headers 13 having the form of an arch; at one end of the headers 13 are hinged at 14 the axles 10—11, whilst at the other header end 15 the said axles are secured to the header by a screw-nut.

Owing to this arrangement, once the header is lifted by means of a jack applied at 16 and the screw-nut 15 has been slackened, the axle can be pivoted about its pivot 14 and the wheel or the rim of the rubber tyre can be taken out.

The elastic frame carries the vehicle platform through the intermediary of pins 17 arranged at the points where the ideal sides of the rhombus A—B—C—D cross the springs building up the vehicle frame.

With this arrangement the springs 12 act sometimes as springs, sometimes as balancers and sometimes in both capacities according to the conditions of the road pavement. Since namely the irregularities of the road produce a jolting effect on the four wheels, in the case that the four wheels simultaneously meet four equal obstacles or four equal holes, the jolting will be transmitted to the platform in a damped degree by the four springs. In the case the two leading wheels mount upon two obstacles whilst the driving wheels sink into holes as deep as the obstacles are high (or conversely) the sinking of the wheels (of positive sign for one wheel pair and of negative sign for the other pair) will have a maximum value, but no shaking effect will be transmitted to the platform because the center points E—F—G—H where the connection between the platform and the springs is effected remain at rest.

In the former case a bending of the springs will take place, in the latter case there will be no bending and the springs will merely behave as balancers. Since all the numberless cases that may occur are comprised between the two extremes we have just examined, it is plain that the connecting points E—F—G—H are those with which the least amount of jolting takes place when running on uneven ground.

The platform directly carries the driving set 19 comprising the engine, the change speed with controlling gear, the differential and the brakes acting upon the latter. The position of the driving set 19 is such that the axis of the differential practically coincides with the axis X—Y of the driving wheels, so that the motion is transmitted to the wheels directly across the axles 20 and the Cardan couplings 21, the longitudinal shaft existing in all motor vehicles being dispensed with.

The platform directly supports also the remaining parts of the vehicle viz radiator, tank, steering gear, car body and accessories.

The steering gear simultaneously acts upon both guiding wheels 6—7 in the following manner:

The worm gear enclosed in the box 23 actuates the cross shaft 24 on whose ends are keyed the cranks of equal length 25. Through the tie rods 26 and 27 and hinged connections, the cranks 25 operate the corresponding steering levers 29 which too are equal in length and secured to the inner boxes 9 enclosing the ball bearings of the wheels.

By operating the steering handwheel, the two guiding wheels are swung about their vertical pivot by equal angles but in opposite direction, so that their main axes meet at a point O which is always situated on the cross axis X—Y; the vehicle turns about this point O. When the point O coincides with the centre A or B of one of the driving wheels, this wheel forms the rotation center of the vehicle and ceases to turn, whilst the other wheel alone undertakes the whole of the driving function due to the interposed differential.

Having now particularly described and ascertained the nature of my said invention and in what manner the same is to be performed, I declare that what I claim is:—

1. Connecting arrangement for motor vehicle wheels situated at the vertices of a rhombus, comprising an elastic frame built up on each side by a pair of laminated aligned springs pivotally connected with with each other and with the axle of the driving wheels carrying the vehicle platform at points corresponding to the intersection of the springs with the centers of the ideal sides of the rhombus at whose vertices the wheels are arranged, and connected to the free ends of arched headers to one end of which is hinged one end of the axle of the guiding wheels, whilst to the other end of the header is secured by means of a screw-nut the other end of the same axle, substantially as described and illustrated and for the purposes set out above.

2. Connecting arrangement for motor vehicle wheels as per claim 1 in which each guiding wheel is mounted on a vertical spindle or pivot carried by the wheel's axle and whose axis lies in the center plane of the wheel, substantially as described and illustrated.

Signed at Milan (Italy), this day of March 1921.

OTTAVIO FUSCALDO.